(12) United States Patent
Yasuda et al.

(10) Patent No.: US 7,013,124 B2
(45) Date of Patent: Mar. 14, 2006

(54) WIDE BAND TUNER

(75) Inventors: Masashi Yasuda, Aichi (JP); Akira Fujishima, Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 499 days.

(21) Appl. No.: 10/297,297

(22) PCT Filed: Apr. 5, 2002

(86) PCT No.: PCT/JP02/03466

§ 371 (c)(1),
(2), (4) Date: Apr. 7, 2003

(87) PCT Pub. No.: WO02/082671

PCT Pub. Date: Oct. 17, 2002

(65) Prior Publication Data

US 2003/0190900 A1     Oct. 9, 2003

(30) Foreign Application Priority Data

Apr. 6, 2001  (JP)  ............................. 2001-108164

(51) Int. Cl.
*H04B 1/16*     (2006.01)
*H04B 1/18*     (2006.01)
*H04B 1/26*     (2006.01)
*H04N 5/50*     (2006.01)

(52) U.S. Cl. ................... 455/340; 348/731; 455/173.1; 455/197.3; 455/339; 455/209

(58) Field of Classification Search ............ 455/150.1, 455/153.1, 176.1, 188.1, 191.3, 304, 306, 455/77, 160.1, 161.1, 168.1, 169.1, 173.1, 455/178.1, 182.3, 184.1, 191.1, 192.3, 195.1, 455/197.3, 87, 187.1, 340, 339, 209, 487; 348/487, 731, 732, 733; 725/57
See application file for complete search history.

(56) References Cited

U.S. PATENT DOCUMENTS

| 5,572,264 A | * | 11/1996 | Mizukami et al. ........... 348/735 |
| 6,002,924 A | * | 12/1999 | Takano .................... 455/161.1 |
| 6,094,236 A | * | 7/2000 | Abe et al. ................... 348/731 |
| 6,175,746 B1 | * | 1/2001 | Nakayama et al. ....... 455/552.1 |

(Continued)

FOREIGN PATENT DOCUMENTS

JP           53-66311           6/1978

(Continued)

OTHER PUBLICATIONS

International Search Report corresponding to application No. PCT/JP02/03466 dated Jul. 16, 2002.

(Continued)

*Primary Examiner*—Rexford Barnie
*Assistant Examiner*—Andrew Wendell
(74) *Attorney, Agent, or Firm*—RatnerPrestia (57) ABSTRACT

When changeover switch (26) selects the output of L band filter (23), changeover switch (28) is turned off and mixer (29) is operated as an amplifier such that the oscillation frequency of local oscillator (31) is controlled based on data fed to data terminal (37) and a channel selection can be performed in mixer (32). When changeover switch (26) selects the output of V band filter (25), changeover switch (28) is turned on and a channel selection is performed based on data fed to data terminal (37) in mixer (29). With this arrangement, the need for a tuning filter is eliminated and a broadband tuner not requiring manpower for adjustments can be provided.

9 Claims, 4 Drawing Sheets

U.S. PATENT DOCUMENTS

| | | | |
|---|---|---|---|
| 6,343,209 B1 * | 1/2002 | Maeda et al. | 455/160.1 |
| 6,657,678 B1 * | 12/2003 | Mizukami et al. | 348/726 |
| 6,822,697 B1 * | 11/2004 | Osada | 348/731 |
| 2002/0047942 A1 * | 4/2002 | Vorenkam et al. | 348/731 |
| 2003/0199261 A1 * | 10/2003 | Higuchi | 455/168.1 |
| 2004/0004674 A1 * | 1/2004 | Birleson | 348/731 |

FOREIGN PATENT DOCUMENTS

| | | |
|---|---|---|
| JP | 57-61344 | 4/1982 |
| JP | 58-166134 | 11/1983 |
| JP | 9-181631 | 7/1997 |
| JP | 10-13279 | 1/1998 |
| JP | 10-271088 | 10/1998 |
| JP | 2001-24535 | 1/2001 |
| JP | 2001-44872 | 2/2001 |
| JP | 2001-45394 | 2/2001 |

OTHER PUBLICATIONS

English translation of Form PCT/ISA/210.

* cited by examiner

WIDE BAND TUNER

This application is a U.S. national phase application of PCT International application PCT/JP02/03466.

TECHNICAL FIELD

The present invention relates to a broadband tuner for receiving signals having two different frequency bands.

BACKGROUND ART

A conventional tuner will be described below.

Figure 4:
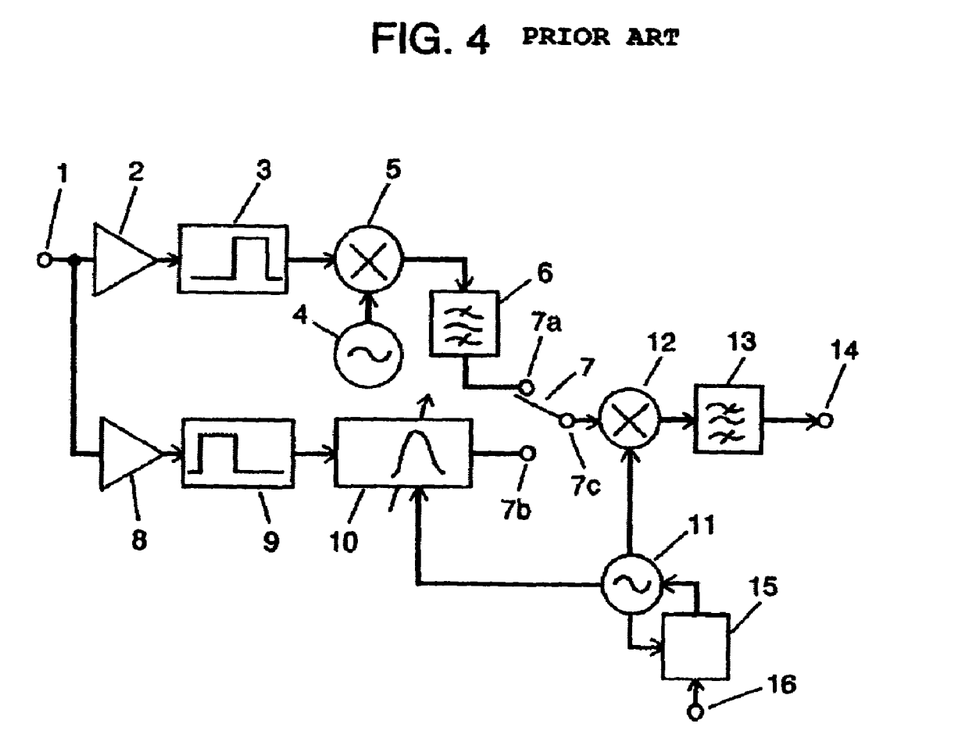
FIG. 4 is a block diagram of a conventional broadband tuner.

In the conventional tuner as shown in FIG. 4, input terminal 1 receiving a high-frequency digital signal is connected to high-frequency amplifier 2 for L band, the output of this high-frequency amplifier 2 is fed into bandpass filter 3 allowing L band frequency to pass through, and the output of this bandpass filter 3 and the output of local oscillator 4 oscillating a fixed frequency are fed into mixer 5.

The output of mixer 5 is connected to bandpass filter 6 allowing V band frequency to pass through. The output of bandpass filter 6 is connected to one terminal 7a of electronic changeover switch 7, while the output of tuning filter 10, to be described later, is connected to the other terminal 7b.

Input terminal 1 is connected also to high-frequency amplifier 8 for V band, the output of this frequency amplifier 8 is fed into bandpass filter 9 allowing V band frequency to pass through, and the output of this bandpass filter 9 is fed into tuning filter 10.

Common terminal 7c of changeover switch 7 is connected to one input of mixer 12, while the other input thereof is coupled with the output of local oscillator 11.

The output of mixer 12 is fed into 39-MHz bandpass filter 13 and the output of this bandpass filter 13 is connected to output terminal 14.

Further, local oscillator 11 is loop-connected to PLL circuit 15 and this PLL circuit 15 is supplied with data from data terminal 16. The output of PLL circuit 15 is also applied to the tuning terminal of tuning filter 10 via local oscillator 11.

Operation of the broadband tuner configured as above will be described below.

When changeover switch 7 is turned to side 7a in order that L band is received, a high-frequency signal of L band supplied from input terminal 1 is passed through bandpass filter 3 and mixed with the output of local oscillator 4 in mixer 5 to be converted into V band frequency. This signal is passed through bandpass filter 6 and then mixed with the output of local oscillator 11 in mixer 12, whereby the signal is channel-selected and, at the same time, converted into intermediate frequency of 39 MHz. The intermediate frequency is put out from output terminal 14 via bandpass filter 13 whose center frequency is 39 MHz. Here, the oscillation frequency of local oscillator 11 is controlled in PLL circuit 15 based on data supplied to data terminal 16; namely, the channel selection is performed based on data supplied to data terminal 16.

On the other hand, when changeover switch 7 is turned to side 7b in order that V band is received, a high-frequency signal of V band supplied from input terminal 1 is passed through bandpass filter 9 and a desired wave is selected in tuning filter 10 for eliminating interfering waves. The center frequency of tuning filter 10 is varied by the output of PLL circuit 15 so that a desired frequency and frequencies in its vicinity are passed therethrough.

The desired frequency is mixed with the output of local oscillator 11 in mixer 12, whereby the frequency is channel-selected and, at the same time, converted into intermediate frequency of 39 MHz. This intermediate frequency is passed through bandpass filter 13 whose center frequency is 39 MHz and put out from output terminal 14. Here, the oscillation frequency of local oscillator 11 is controlled by PLL circuit 15 based on data supplied to data terminal 16; namely, the channel selection is performed based on data supplied to data terminal 16.

Incidentally, the L band frequency here denotes radio waves having a bandwidth of approximately 300 MHz centering about 1.4 GHz and the V band frequency here denotes radio waves having a bandwidth of approximately 100 MHz centering about 200 MHz.

In the conventional configuration as described above, however, since it operates as a single tuner in signal reception of V band, it required to have tuning filter 10 to eliminate image frequency interference. When such tuning filter 10 is employed, enormous amounts of manpower were required for adjustments of the same. More specifically, since the output of PLL circuit 15 is applied to local oscillator 11 and tuning filter 10 having their respective variable-capacitance diodes different from each other, frequency variations in separate diodes had to be adjusted with the same voltage from PLL circuit 15 by using inductance or the like, which took much time and hence there was the problem of increased manpower.

DISCLOSURE OF INVENTION

A broadband tuner is provided which comprises: an input terminal supplied with a high-frequency digital signal; a first fixed filter, allowing L band frequency to pass through, connected to the input terminal; a second fixed filter, allowing V band frequency to pass through, connected to the input terminal; a first changeover switch having the output of the first fixed filter connected to one terminal thereof and the output of the second fixed filter connected to the other terminal thereof; a first mixer having a common terminal of the first changeover switch applied to one input thereof and the output of a first local oscillator connected to the other input thereof via a second changeover switch; a third fixed filter, allowing L band frequency to pass through, connected to the output of the first mixer; a second mixer having the output of the third fixed filter applied to one input thereof and the output of a second local oscillator connected to the other input thereof; an output terminal having the output of the second mixer applied thereto; a first PLL circuit loop-connected to the first local oscillator; a first data terminal for supplying the first PLL circuit with data; a second PLL circuit loop-connected to the second local oscillator; and a second data terminal for supplying the second PLL circuit with data, in which, when the first changeover switch selects the output of the first fixed filter, the second changeover switch is turned off such that the first mixer is operated as an amplifier and the oscillation frequency of the second local oscillator is controlled based on data supplied to the second data terminal, whereby the signal output from the third fixed filter is channel-selected and converted into a predetermined frequency in the second mixer and, when the first changeover switch selects the output of the second fixed filter, the second changeover switch is turned on and the oscillation frequency of the first local oscillator is controlled based on data supplied to the first data terminal whereby a channel selection is performed while V band frequency is converted into L band in the first mixer, and the output of the third fixed filter is converted into a predetermined frequency in the second mixer.

BEST MODE FOR CARRYING OUT THE INVENTION

Preferred embodiments of a broadband tuner according to the present invention will be described below with reference to the accompanying drawings.

(Preferred Embodiment 1)

Figure 1:
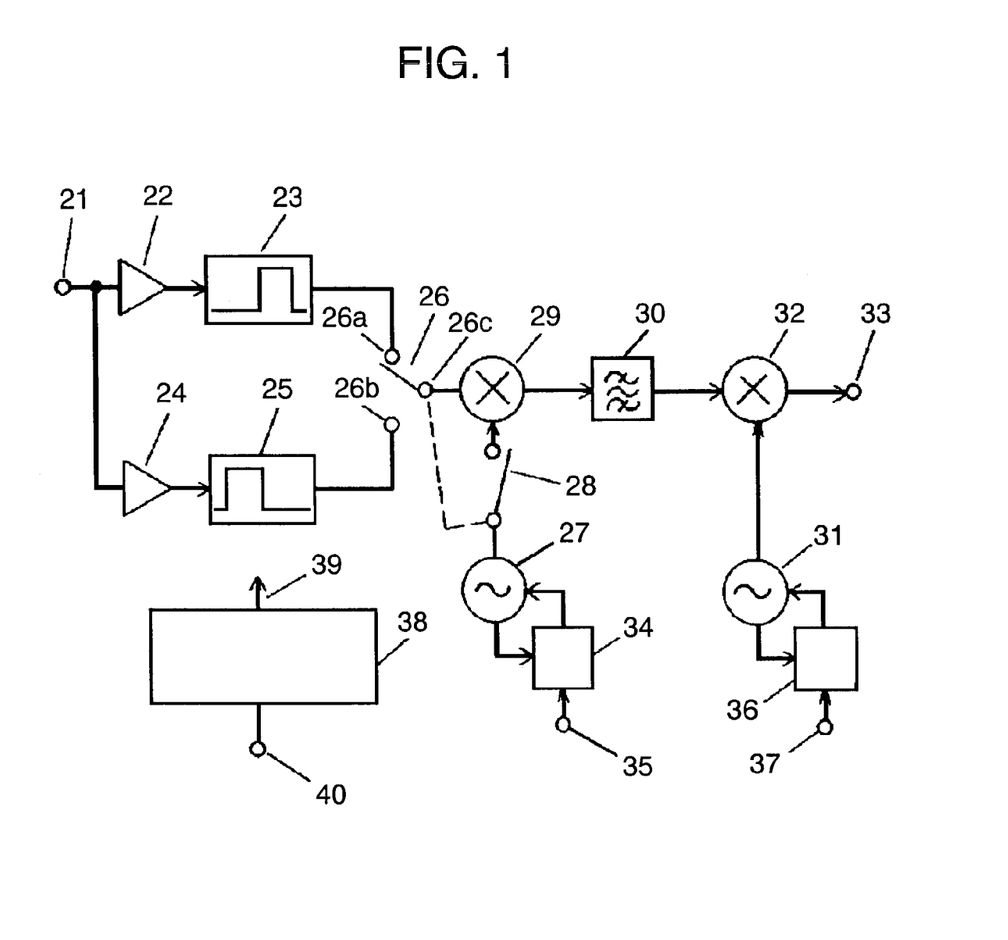
FIG. 1 is a block diagram of a broadband tuner in a first preferred embodiment of the present invention.

FIG. 1 is a block diagram of a broadband tuner of the preferred embodiment 1.

In FIG. 1, input terminal 21 receiving a high-frequency digital signal is connected to high-frequency amplifier 22 and the output of this high-frequency amplifier 22 is fed into fixed L bandpass filter 23 allowing L band frequency to pass through. On the other hand, the output of high-frequency amplifier 24 coupled with input terminal 21 is connected to fixed V bandpass filter 25 allowing V band frequency to pass through. The output of the aforesaid fixed filter 23 is coupled to one terminal 26a of changeover switch 26, while the output of V bandpass filter 25 is coupled to the other terminal 26b. And common terminal 26c of changeover switch 26 is applied to one input of mixer 29, while the output of local oscillator 27 is fed into the other input of mixer 29 via changeover switch 28.

The output of mixer 29 is coupled to fixed L bandpass filter 30 allowing L band frequency to pass through and, while the output of L bandpass filter 30 is fed to one input of mixer 32, the output of local oscillator 31 is coupled to the other input.

The output of mixer 32 is coupled to a bandpass filter whose center frequency is 39 MHz and the output of this bandpass filter is coupled to output terminal 33. Local oscillator 27 is loop-connected to PLL circuit 34 and this PLL circuit 34 is supplied with data from data terminal 35. Further, local oscillator 31 is loop-connected to PLL circuit 31 and this PLL circuit 36 is supplied with data from data terminal 37.

Although a bandpass filter whose enter frequency is 1.4 GHz and bandwidth is 600 MHz is used here as L bandpass filter 23, it may be a high-pass filter allowing 1.1 GHz and above to pass through.

Although a bandpass filter whose center frequency is 200 MHz and bandwidth is 100 MHz is used here as V bandpass filter 25, it may be a low-pass filter allowing 300 MHz and below to pass through.

L bandpass filter 30 is a bandpass filter whose center frequency is 1.4 GHz and bandwidth is 600 MHz.

Changeover switches 26 and 28 are electrically-switchable known switches formed of pin diodes or the like.

Output 39 of microcomputer 38 is connected to data terminal 35 and data terminal 37. It is also connected to the switch controlling terminals of changeover switches 26 and 28. Input terminal 40 is connected to microcomputer 38.

Operation of the broadband tuner configured as described above will be demonstrated below.

When changeover switch 26 is turned to side 26a in order that L band is received, changeover switch 28 is turned off and mixer 29 operates as an amplifier for amplifying L band signal. More specifically, the high-frequency signal of L band fed from input terminal 21, after being passed through L bandpass filter 23 and changeover switch 26, is amplified by mixer 29 and passed through fixed filter 30 of 1.4 GHz. This signal is mixed with the output of local oscillator 31 in mixer 32, whereby the signal is channel-selected and, at the same time, converted into intermediate frequency of 39 MHz. The intermediate frequency is output from output terminal 33. Here, the oscillation frequency of local oscillator 31 is controlled in PLL circuit 36 based on data fed to data terminal 37; that is, the channel selection is performed based on the data fed to data terminal 37.

Then, when changeover switch 26 is turned to side 26b in order that V band is received, changeover switch 28 is turned on. More specifically, the high-frequency signal of V band fed from input terminal 21, after being passed through V bandpass filter 25 and changeover switch 26, is mixed with the output of local oscillator 27 in mixer 29, whereby the signal is channel-selected and, at the same time, converted into intermediate frequency of 1.4 GHz.

The intermediate frequency is passed through fixed filter 30 whose center frequency is 1.4 GHz, converted into 39 MHz in mixer 32, and put out from output terminal 33. In this case, the oscillation frequency of local oscillator 27 is controlled in PLL circuit 34 based on data fed to data terminal 35; namely, the channel selection is performed based on the data fed to data terminal 35.

According to the present preferred embodiment 1, as described above, a double superheterodyne configuration by the use of mixer 29 and mixer 32 is provided for reception of V band frequency. Therefore, it is free from interference of the image frequency even if tuning filter 10 as in the conventional case shown in FIG. 4 is not used. Accordingly, the need for manpower for adjusting tuning filter 10 can be cut down.

Further, since the need for mounting tuning filter 10 is eliminated, reduction in size and manpower can be attained.

Further, both frequency bands of V band and L band can be received by switching between changeover switches 26 and 28.

Furthermore, though a double superheterodyne configuration is adopted, the number of mixers is not increased from that in the conventional art.

It is possible to have mixer 29, local oscillator 27, PLL circuit 34, mixer 32, local oscillator 31, PLL circuit 36, changeover switch 26, and changeover switch 28 integrated into one package. By such integration, reduction in size and increase in reliability can be attained.

Further, by adapting microcomputer 38 to control PLL circuit 34, PLL circuit 36, changeover switch 26, and changeover switch 28, controlling of these members can be easily performed by externally changing data fed to input terminal 40.

(Preferred Embodiment 2)

Figure 2:
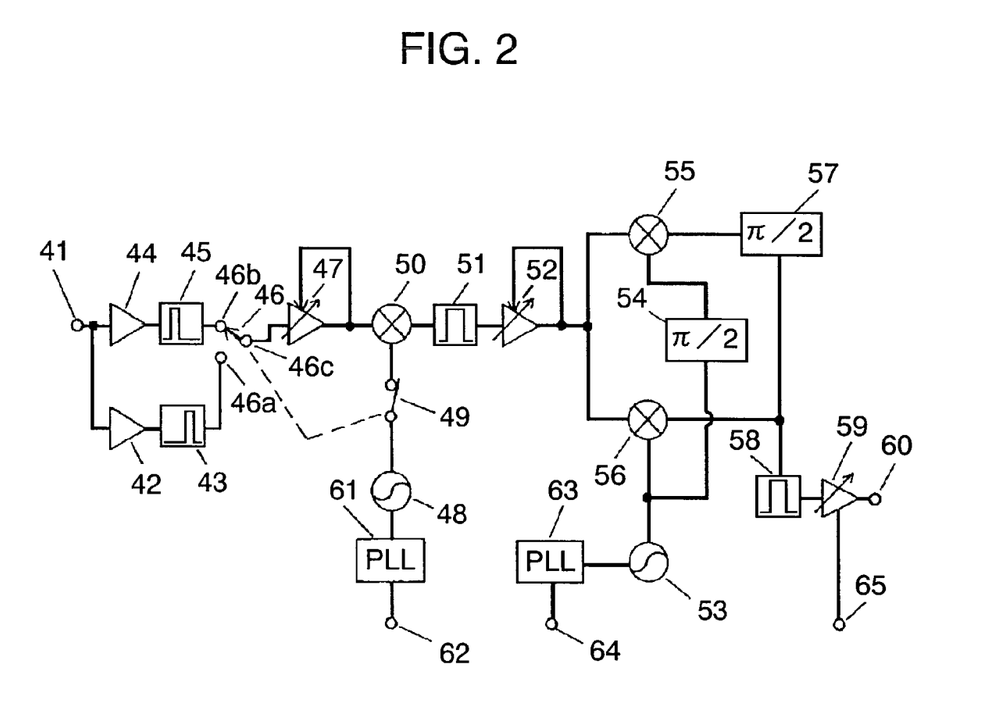
FIG. 2 is a block diagram of a broadband tuner in a second preferred embodiment of the present invention.

The broadband tuner in the preferred embodiment 2 is such that eliminates image interference by using two mixers and two 90-degree phasers instead of mixer 32 used in the preferred embodiment 1.

In FIG. 2, high-frequency amplifier 42 is connected to input terminal 41 receiving a high-frequency digital signal and the output of high-frequency amplifier 42 is fed into fixed filter 43 allowing L band frequency to pass through.

Further, the output of high-frequency amplifier 44 connected to input terminal 41 is coupled to fixed filter 45 allowing V band frequency to pass through.

Then, while the output of fixed filter 43 is coupled to one terminal 46a of changeover switch 46, the output of fixed filter 45 is coupled to the other terminal 46b, and common terminal 46c of changeover switch 46 is input to AGC amplifier 47. While the output of AGC amplifier 47 is fed to one input of mixer 50, the output of local oscillator 48 is fed to the other input via changeover switch 49.

The output of mixer 50 is connected to fixed filter 51 allowing L band frequency to pass through and the output of this fixed filter 51 is input to AGC amplifier 52. The output of AGC amplifier 52 is fed to one input of mixer 55, while the output of local oscillator 53 is fed to the other input via 90-degree phaser 54.

Further, the output of AGC amplifier 52 is fed to one input of mixer 56, while local oscillator 53 is connected to the other input.

Ninety-degree phaser 57 is connected between the output of mixer 55 and the output of mixer 56, the output of mixer 56 is input to fixed filter 58, the output of this fixed filter 58 is input to AGC amplifier 59, and the output of this AGC amplifier 59 is fed to output terminal 60.

While PLL circuit 61 is loop-connected to local oscillator 48 and data is fed into this PLL circuit 61 from data terminal 62, PLL circuit 63 is loop-connected to local oscillator 53 and data is fed into this PLL circuit 63 from data terminal 64.

Operation in the broadband tuner configured as described above will be demonstrated below. Point in the preferred embodiment 2 different from that in the preferred embodiment 1 is as follows: that is, while one portion of the output of AGC amplifier 52 connected to the output of fixed filter 51 is put out via mixer 56 and the other portion is put out via mixer 55, these output portions are rendered 180 degrees out of phase with each other by two 90-degree phasers 54 and 57, and thereby interfering waves are eliminated. Otherwise, this embodiment is the same as preferred embodiment 1.

More particularly, when the output of fixed filter 43 is selected by changeover switch 46, changeover switch 49 is turned off and mixer 50 is operated as an amplifier. Then, the oscillation frequency of local oscillator 53 is controlled based on data fed to terminal 64 and, thereby, the signal output from fixed filter 51 is channel-selected and, at the same time, converted into a predetermined frequency in mixer 56 and mixer 55. This signal is put out from output terminal 60 via fixed filter 58.

On the other hand, when the output of fixed filter 45 is selected by changeover switch 46, changeover switch 49 is turned on and the oscillation frequency of local oscillator 48 is controlled based on data fed to data terminal 62, whereby frequency of V band is converted into L band and a channel selection is performed at the same time in mixer 50. The output of fixed filter 51 is converted into a predetermined frequency in mixer 55 and mixer 56 and put out from output terminal 60 via fixed filter 58.

Thus, in reception of V band frequency, a double superheterodyne configuration is provided by the use of mixer 50, as well as mixer 55 and mixer 56. Hence, it is made free from interference of the image frequency even if a tuning filter is not employed. Therefore, the need for manpower for adjusting the tuning filter can be eliminated.

Further, since a tuning filter is not required to be mounted, reduction in size and manpower can be attained.

Further, in reception of L band, the output of mixer 56 is coupled with a signal rendered 180 degrees out of phase via two 90-degree phasers. Hence, image interfering frequencies can be eliminated.

Further, either of V band and L band frequencies can be received by switching between changeover switches 46 and 49.

Here, though a bandpass filter whose center frequency is 1.4 GHz and bandwidth is 600 MHz is used as fixed filter 43, it may be a high-pass filter allowing frequencies above 1.1 GHz to pass through.

Though a bandpass filter whose center frequency is 200 MHz and bandwidth is 100 MHz is used as fixed filter 45, it may be a low-pass filter allowing frequencies below 300 MHz to pass through.

Fixed filter 51 is such a bandpass filter that has a center frequency of 1.4 GHz and a bandwidth of 600 MHz.

Fixed filter 58 is such a bandpass filter that has a center frequency of 39 MHz and a bandwidth of 6 MHz.

Changeover switches 46 and 49 are electronically-switchable known switches formed of pin diodes and the like.

Input terminal 65 of AGC control voltage, coupled with AGC amplifiers 47, 52, and 59, is externally controlled.

(Preferred Embodiment 3)

Figure 3:
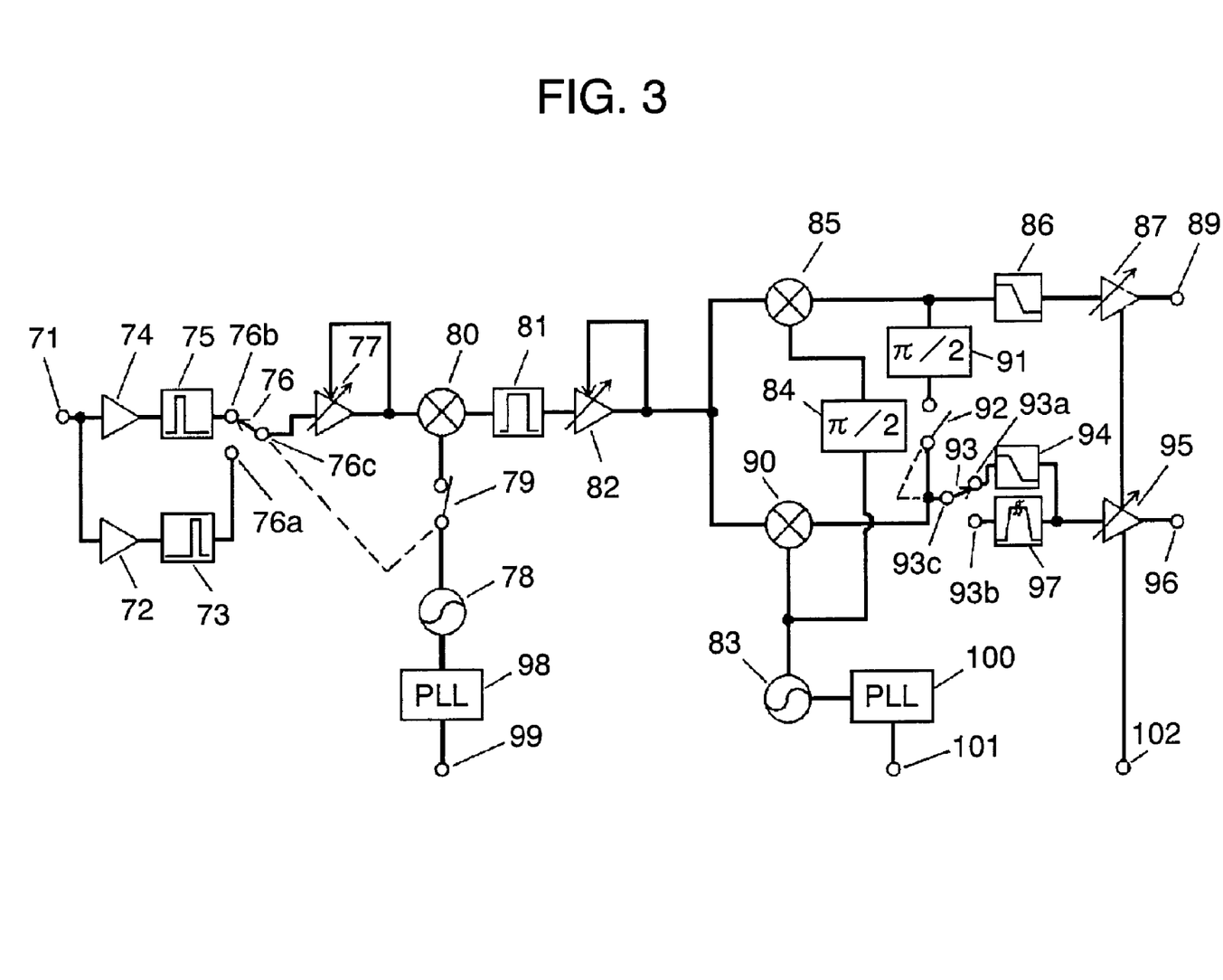
FIG. 3 is a block diagram of a broadband tuner in a third preferred embodiment of the present invention.

The broadband tuner of the preferred embodiment 3 is such that is switchable between an IF outputting tuner using two mixers and two 90-degree phasers, instead of mixer 32 of the preferred embodiment 1, for eliminating image interference and an IQ detecting tuner using two mixers.

In FIG. 3, input terminal 71 is supplied with a high-frequency digital signal, this input terminal 71 is connected to fixed filter 73 allowing L band frequency to pass through via high-frequency amplifier 72, and input terminal 71 is also connected to fixed filter 75 allowing V band frequency to pass through via high-frequency amplifier 74.

The output of fixed filter 73 is connected to one terminal 76a of changeover switch 76, the output of fixed filter 75 is connected to the other terminal 76b, and common terminal 76c of changeover switch 76 is fed into AGC amplifier 77. The output of AGC amplifier 77 is coupled to one input of mixer 80 and the output of local oscillator 78 is fed into the other input via changeover switch 79.

The output of mixer 80 is connected to fixed filter 81 allowing L band frequency to pass through and this fixed filter 81 is fed into AGC amplifier 82. The output of AGC amplifier 82 is connected to one input of mixer 85, while the output of local oscillator 83 is connected to the other input via 90-degree phaser 84. The output of mixer 85 is connected to AGC amplifier 87 via low-pass filter 86 and the output of AGC amplifier 87 is put out to output terminal 89.

The output of AGC amplifier 82 is connected to one input of mixer 90, while the output of local oscillator 83 is connected to the other input.

A series connection of 90-degree phaser 91 and changeover switch 92 is connected between the output of mixer 85 and the output of mixer 90. Common terminal 93c of changeover switch 93 is connected to the output of mixer 90, one terminal 93a of changeover switch 93 is connected to low-pass filter 94, and the output of low-pass filter 94 is connected to AGC amplifier 95. The output of AGC amplifier 95 is connected to output terminal 96. Bandpass filter 97 is connected between the other terminal 93b of changeover switch 93 and low-pass filter 94. PLL circuit 98 is loop-connected to local oscillator 78 and this PLL circuit 98 is supplied with data from data terminal 99. PLL circuit 100 is loop-connected to local oscillator 83 and this PLL circuit 100 is supplied with data from data terminal 101.

Relationship between changeover switches 92 and 93 will be described below. Referring to the relationship, there is a first operation mode, in which changeover switch 92 is turned off and changeover switch 93 is turned to the side of one terminal 93a, i.e., to the side of low-pass filter 94, and a second operation mode, in which changeover switch 92 is turned on and changeover switch 93 is turned to the side of the other terminal 93b, i.e., to the side of bandpass filter 97.

Control terminal 102 is for externally controlling gains in AGC amplifiers 77, 82, 87, and 95.

Here, changeover switches 92 and 93 are adapted to be electronically switched by pin diodes and these are operated interlocked with each other. More specifically, in the first operation mode, changeover switch 92 is turned off and changeover switch 93 is connected to the side of one terminal 93a, i.e., to the side of low-pass filter 94. Accordingly, the tuner in the present preferred embodiment 3 operates as an IQ detection tuner, in which I signal is put out from output terminal 89 and Q signal is put out from output terminal 96.

On the other hand, in the second operation mode, changeover switch 92 is turned on and changeover switch 93 is turned to the side of the other terminal 93b, i.e., to the side of bandpass filter 97. Accordingly, the tuner in the present preferred embodiment 3 operates as an IF signal outputting tuner, in which IF signal is put out from output terminal 96.

Ninety-degree phasers 84 and 91 are phasers causing a delay in the phase by ninety degrees. Since, in the IF tuner, the output of mixer 85 is passed through 90-degree phasers 84 and 91 in series, it is, after all, delayed 180 degrees when it is combined with the output of mixer 90. Thus interference signals can be eliminated.

In the IQ detection tuner, baseband signals are put out from output terminals 89 and 96. In the IF outputting tuner, an IF signal of approximately 400 MHz is put out from output terminal 96.

In the preferred embodiment 3, although the signal fed to input terminal 71 was said to be ground wave signal approximately between 50 MHz and 860 MHz, it may be digital satellite broad cast signal approximately between 950 MHz and 2.2 GHz. At this time, the center frequency of bandpass filter 81 is such that passes each band and attenuates undesired band. The output of mixer 80 is set to intermediate frequency of 1.4 GHz or 1.2 GHz. Hence, bandpass filter 81 also allows the above frequency to pass through.

The cutoff frequency of low-pass filters 86 and 94 is around 50 MHz, the center frequency of bandpass filter 97 is around 400 MHz, and its bandwidth is around 30 MHz.

Further, since the circuit of the present preferred embodiment 3 is formed of balanced circuits, a tuner immune to noise interference can be obtained.

Since the tuner can be used as two kinds of tuners, reduction in manpower can be attained by integrating these circuits in mass production. Miniaturization can also be attained by the integration.

In the process of manufacturing, changeover switches 92 and 93 may be changeably produced by changing manner of mounting of a jumper resistor. Then, it can be fixed beforehand whether IF outputting tuner or IQ detection tuner is produced and, hence, it is not necessary to change one to the other afterward. Throughout preferred embodiments 1, 2, and 3, by having at least mixers and local oscillators formed of balanced circuits and integrated, antinoise performance can be improved. Further, by integrating circuits with mixers and local oscillators formed of silicon, germanium elements, tuners can be provided with decreased manpower.

According to the present invention as described above, there is provided a double superheterodyne configuration using a first mixer and a second mixer for reception of V band frequency. Hence, interference of the image frequency can be eliminated without using a tuning filter. Accordingly, manpower for adjusting the tuning filter becomes unnecessary.

Further, since a tuning filter is not required to be mounted, reduction in size and manpower can be attained.

Further, both V band and L band frequency bands can be received by switching therebetween with changeover switches.

Further, although there is provided a double superheterodyne configuration, the number of mixers is kept as before.

INDUSTRIAL APPLICABILITY

The present invention relates to a broadband tuner capable of receiving two different frequency bands.

Since, in the present invention, a double superheterodyne configuration using a first mixer and a second mixer is provided for reception of V band frequency, interference of image frequencies can be avoided without using a tuning filter and, hence, reduction in size and manpower can be attained.

The invention claimed is:

1. A broadband tuner comprising:
   an input terminal supplied with a high-frequency digital signal;
   a first fixed filter, allowing L band frequency to pass through, connected to said input terminal;
   a second fixed filter, allowing V band frequency to pass through, connected to said input terminal;
   a first changeover switch having an output of said first fixed filter connected to one terminal thereof and an output of said second fixed filter connected to the other terminal thereof;
   a first mixer having a common terminal of said first changeover switch applied to one input thereof and an output of a first local oscillator connected to the other input thereof via a second changeover switch;
   a third fixed filter, allowing L band frequency to pass through, connected to an output of said first mixer;
   a second mixer having an output of said third fixed filter applied to one input thereof and an output of a second local oscillator connected to the other input thereof;
   an output terminal having an output of said second mixer applied thereto;
   a first PLL circuit loop-connected to said first local oscillator;
   a first data terminal for supplying said first PLL circuit with data;
   a second PLL circuit loop-connected to said second local oscillator; and
   a second data terminal for supplying said second PLL circuit with data, wherein,
   when said first changeover switch selects the output of said first fixed filter, said second changeover switch is turned off such that said first mixer is operated as an amplifier and an oscillation frequency of said second local oscillator is controlled based on data supplied to said second data terminal, whereby a signal output from said third fixed filter is channel-selected and converted into a predetermined frequency in said second mixer, and when said first changeover switch selects the output of said second fixed filter, said second changeover switch is turned on and an oscillation frequency of said first local oscillator is controlled based on data supplied to said first data terminal, whereby a channel selection is performed while the V band frequency is converted into L band in said first mixer, and an output of said third fixed filter is converted into a predetermined frequency in said second mixer.

2. The broadband tuner according to claim 1, wherein said first mixer, said first local oscillator, said first PLL circuit, second mixer, second local oscillator, second PLL circuit, first changeover switch, and second changeover switch are integrated into one package.

3. The broadband tuner according to claim 1 further comprising a microcomputer for controlling said first data terminal, said second data terminal, said first changeover switch, and said second changeover switch.

4. A broadband tuner comprising:
an input terminal supplied with a high-frequency digital signal;
a first fixed filter, allowing L band frequency to pass through, connected to said input terminal;
a second fixed filter, allowing V band frequency to pass through, connected to said input terminal;
a first changeover switch having an output of said first fixed filter connected to one terminal thereof and an output of said second fixed filter connected to the other terminal thereof;
a first mixer having a common terminal of said first changeover switch applied to one input thereof and an output of a first local oscillator connected to the other terminal thereof via a second changeover switch;
a third fixed filter, allowing L band frequency to pass through, connected to an output of said first mixer;
a second mixer having an output of said third fixed filter applied to one input thereof and an output of a second local oscillator connected to the other input thereof via a first 90-degree phaser;
a third mixer having the output of said third fixed filter applied to one input thereof and the output of said second local oscillator connected to the other input thereof;
a second 90-degree phaser connected between an output of said second mixer and an output of said third mixer;
a fourth fixed filter connected to an output of said third mixer;
an output terminal supplied with an output of said fourth fixed filter,
a first PLL circuit loop-connected to said first local oscillator;
a first data terminal supplying said first PLL circuit with data;
a second PLL circuit loop-connected to said second local oscillator; and
a second data terminal supplying said second PLL circuit with data, wherein,
when said first changeover switch selects an output of said first fixed filter, said second changeover switch is turned off such that said first mixer is operated as an amplifier and an oscillation frequency of said second local oscillator is controlled based on data input to said second data terminal, whereby a desired channel is selected and converted into a predetermined frequency in said second mixer and said third mixer, and when said first changeover switch selects an output of said second fixed filter, said second changeover switch is turned on and an oscillation frequency of said local oscillator is controlled based on data supplied to said first data terminal, whereby a channel selection is performed while the V band frequency is converted into L band in said first mixer, and an output from said third fixed filter is converted into a predetermined frequency in said second mixer and said third mixer.

5. A broadband tuner comprising:
an input terminal supplied with a high-frequency digital signal;
a first fixed filter, allowing L band frequency to pass through, coupled to said input terminal;
a second fixed filter, allowing V band frequency to pass through, coupled to said input terminal;
a first changeover switch having an output of said first fixed filter connected to one terminal thereof and an output of said second fixed filter connected to the other terminal thereof;
a first mixer having a common terminal of said first changeover switch applied to one input thereof and an output of first local oscillator coupled to the other input thereof via a second changeover switch;
a third fixed filter supplied with an output of said first mixer and allowing L band frequency to pass through;
a second mixer having an output of said third fixed filter applied to one input thereof and an output of a second local oscillator coupled to the other input thereof via a first 90-degree phaser;
a fourth fixed filter coupled with an output of said second mixer;
a first output terminal supplied with an output of said fourth fixed filter;
a third mixer having the output of said third fixed filter applied to one input thereof and the output of said second local oscillator coupled to the other input thereof;
a series connection of a second 90-degree phaser and a third changeover switch connected between an output of said second mixer and an output of said third mixer;
a fifth fixed filter coupled to the output of said third mixer;
a second output terminal coupled with an output of said fifth fixed filter;
a first PLL circuit loop-connected to said first local oscillator;
a first data terminal supplying said first PLL circuit with data;
a second PLL circuit loop-connected to said second local oscillator; and
a second data terminal supplying said second PLL circuit with data, wherein
said broadband tuner has a first operation mode in which said third changeover switch is turned off and a second operation mode in which said third changeover switch is turned on, and wherein,
when said first changeover switch selects an output of said first fixed filter, said second changeover switch is turned off such that said first mixer is operated as an amplifier and the oscillation frequency of said second local oscillator is controlled based on data input to said second data terminal, whereby a signal output from said third fixed filter is channel-selected and converted into a predetermined frequency in said second mixer and third mixer, and, when said first changeover switch selects an output of said second fixed filter, said second changeover switch is turned on and oscillation frequency of said first local oscillator is controlled based on data input to said first data terminal, whereby a channel selection is performed while the V band signal is converted into L band, and the same is converted into a predetermined frequency in said second mixer and said third mixer.

6. The broadband tuner according to claim 5, wherein said fourth fixed filter and said fifth fixed filter are formed of low-pass filter, there is provided a bandpass filter selectably switchable with said fifth fixed filter, and said fifth fixed filter is selected in the first operation mode and said bandpass filter is selected in the second operation mode.

7. The broadband tuner according to claim 5, wherein the first operation mode and the second operation mode are switched therebetween by changing manner of mounting of a jumper resistor.

8. The broadband tuner according to claim 5, wherein at least one of said first to third mixers and said first to second local oscillator is formed of a balanced circuit and integrated circuited.

9. The broadband tuner according to claim 5, wherein at least one of said first to third mixers and said first to second local oscillator is formed of a silicon, germanium device and integrated circuited.

* * * * *